Aug. 31, 1965  W. J. ZIMMERLE  3,203,077
FASTENING ASSEMBLY AND PROCEDURE
Original Filed July 19, 1961  7 Sheets-Sheet 1

INVENTOR.
WILBUR J. ZIMMERLE
BY
HIS ATTORNEY

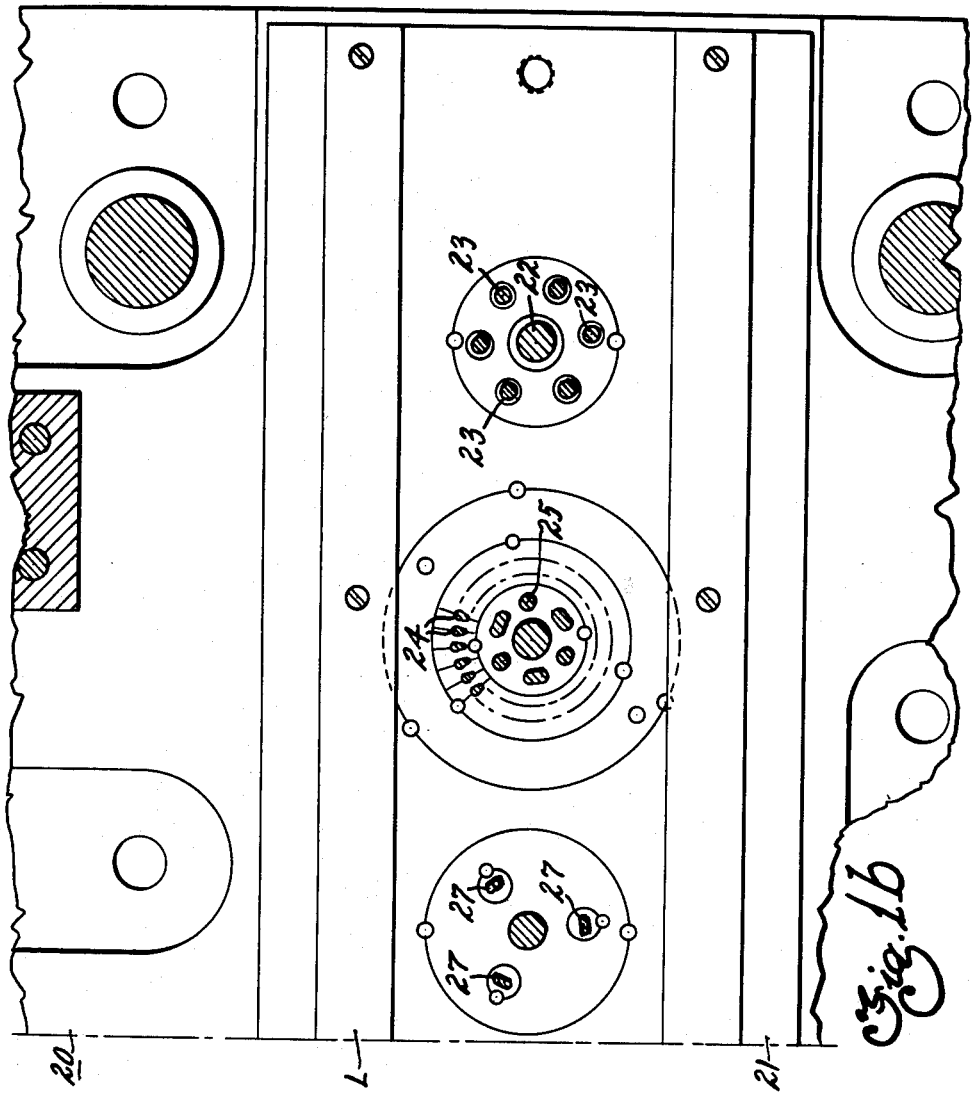

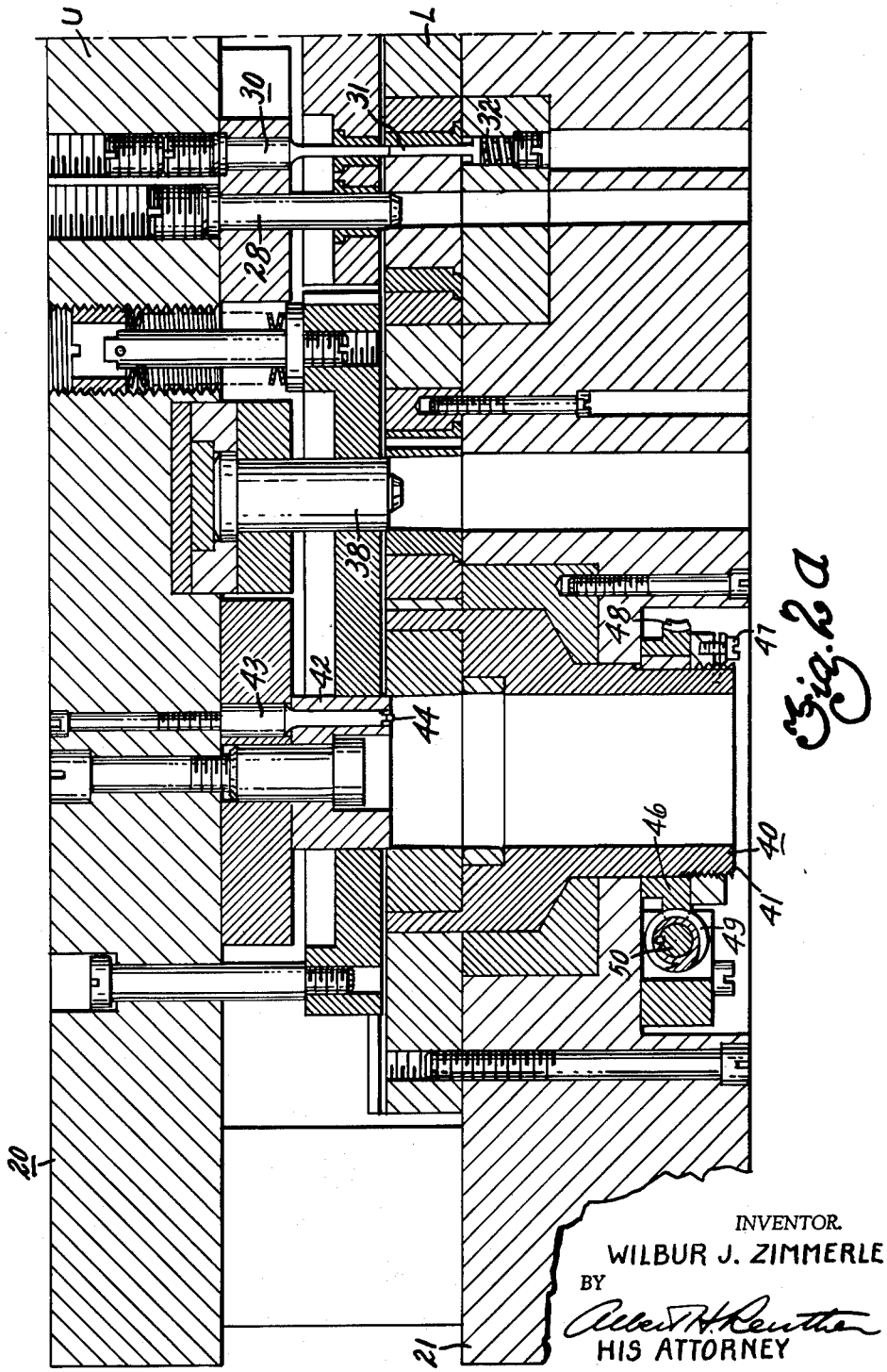

Aug. 31, 1965  W. J. ZIMMERLE  3,203,077
FASTENING ASSEMBLY AND PROCEDURE
Original Filed July 19, 1961  7 Sheets-Sheet 4

INVENTOR.
WILBUR J. ZIMMERLE
BY
*Albert W. Reuther*
HIS ATTORNEY

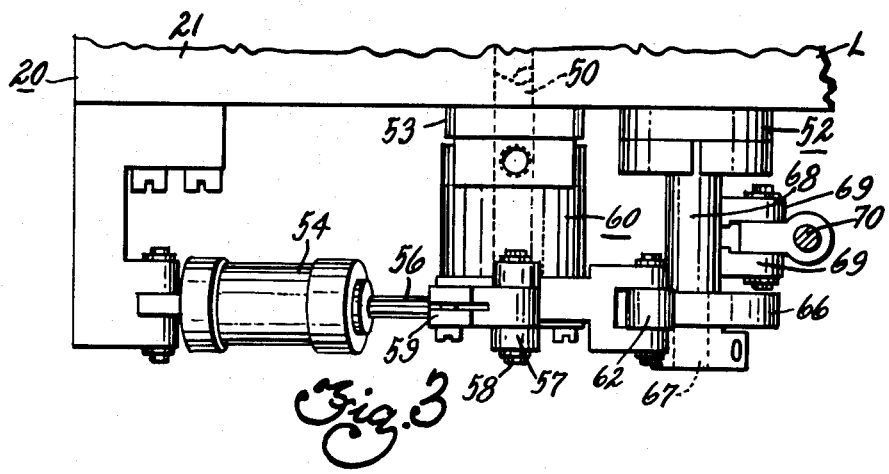

Aug. 31, 1965 W. J. ZIMMERLE 3,203,077
FASTENING ASSEMBLY AND PROCEDURE
Original Filed July 19, 1961 7 Sheets-Sheet 6
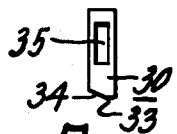
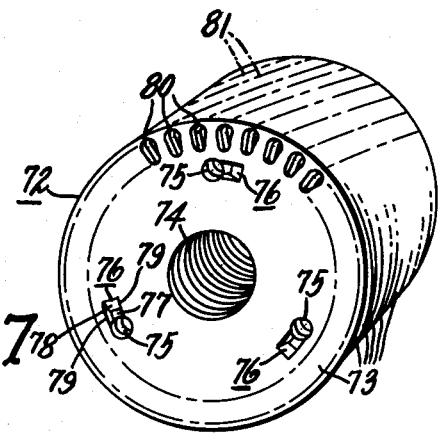
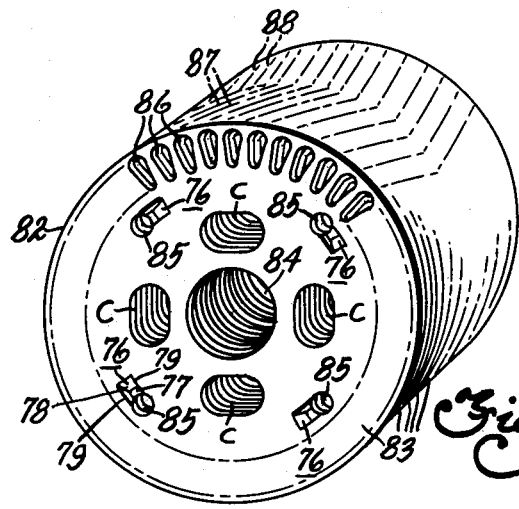
INVENTOR.
WILBUR J. ZIMMERLE
BY
HIS ATTORNEY

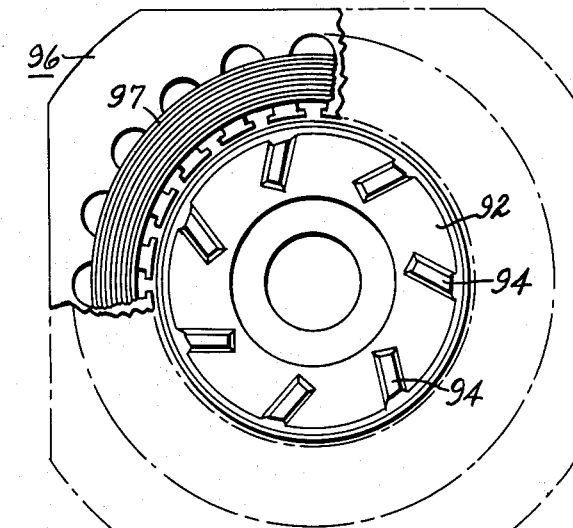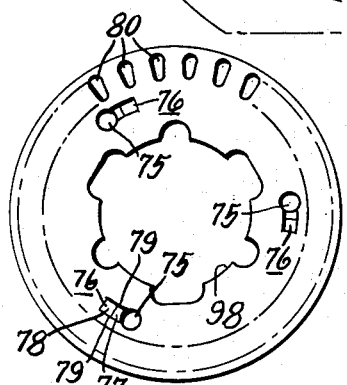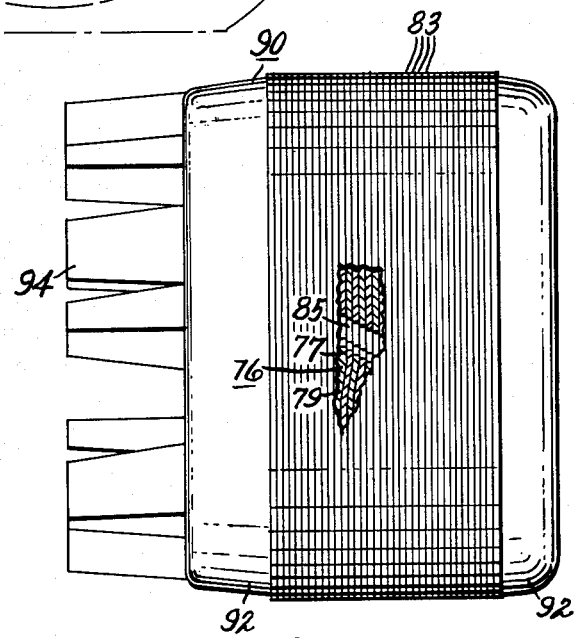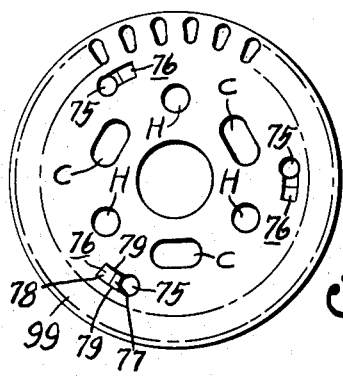

United States Patent Office 3,203,077
Patented Aug. 31, 1965

3,203,077
FASTENING ASSEMBLY AND PROCEDURE
Wilbur J. Zimmerle, Dayton, Ohio, assignor to General
Motors Corporation, Detroit, Mich., a corporation of
Delaware
Original application July 19, 1961, Ser. No. 125,191, now
Patent No. 3,110,831, dated Nov. 12, 1963. Divided
and this application Oct. 17, 1962, Ser. No. 231,121
4 Claims. (Cl. 29—155.5)

This is a division of copending parent application S.N. 125,191 filed July 19, 1961, now U.S. Patent 3,110,831—Zimmerle issued November 12, 1963, and belonging to the assignee of the present invention.

This invention relates to dynamoelectric machine components and, more particularly, to progressive assembly thereof.

An object of this invention is to provide a new and improved dynamoelectric machine lamination fastening assembly and procedure accomplished completely in die means progressively operable to form and join metal laminations.

Another object of this invention is to provide a dynamoelectric machine lamination assembly including a plurality of metal laminations each having predetermined aperturing and slots to be stamped therein as well as radially separated pairs of slits adjacent to aperturing where lamination interlock means including an elbow-shaped portion between the slits can be displaced laterally to include a stretching segment angularly integral at one end with the lamination and terminating in a flattened segment substantially parallel though spaced from the metal lamination from which the end segment was formed.

Another object of this invention is to provide a stack of dynamoelectric machine rotor laminations interlocked and having predetermined alignment relative to each other to be maintained free of rivets, through bolts, welding and the like by use of lamination metal extruded to be stretched in part by die means forming a plateau or platform-like flattened end per se which is displaced to bind along peripheral edging thereof to an adjoining lamination in parallel as well as coplanar position with the flattened end that fits in a location complementary thereto as the die means stretches lamination metal away from between a pair of slits.

A further object of this invention is to provide a skewing of joined metal laminations for dynamoelectric machine motor means to carry a cast metal winding in slots thereof angularly locatable for single as well as multiple herringbone-like spiral interlock as accomplished directly during die assembly thereof by use of only lamination metal displaced in elbow-shaped interlock means including a stretching segment angularly at one end with the lamination and terminating in a flattened end segment to fit substantially coplanar with an adjoining lamination, each of the laminations having a plurality of radially spaced slits extending to one side of aperturing along an edge of which the slits are provided to facilitate interlock stacking of laminations in skewed relation.

Another object of this invention is to provide a procedure of progressively stamping rotor laminations from a continuous strip of metal in sequential slotting and blanking operations at predetermined locations in one of which there is a step of rotating a die portion for a controlled angular indexing to provide predetermined skew and angular relationship of rotor winding slots to carry cast metal joined by end ring means and interlocking the dynamoelectric machine laminations directly by use of stamping mechanism including said die portion per se which aids in metal stretching during formation of elbow-shaped interlock portions having a sharply-barbed edging and flattened end integral therewith for interference fit and sticking of adjacent rotor laminations to each other in predetermined automatic machine stacking.

Further objects and advantages of the present invention will be apparent from the following description, reference being had to the accompanying drawings wherein preferred embodiments of the present invention are clearly shown.

In the drawings:

FIGURES 1a and 1b are plan views of a multi-station progressive die means and assembly mechanism for use in accordance with the present invention.

FIGURES 2a and 2b are side views sectioned in part of the die means and mechanism of FIGURE 1.

FIGURE 3 is a fragmentary view of a die indexing control means for use with the mechanism of FIGURES 1 and 2.

FIGURE 4 is a fragmentary side view of the die indexing control means of FIGURE 3.

Figure 1A:
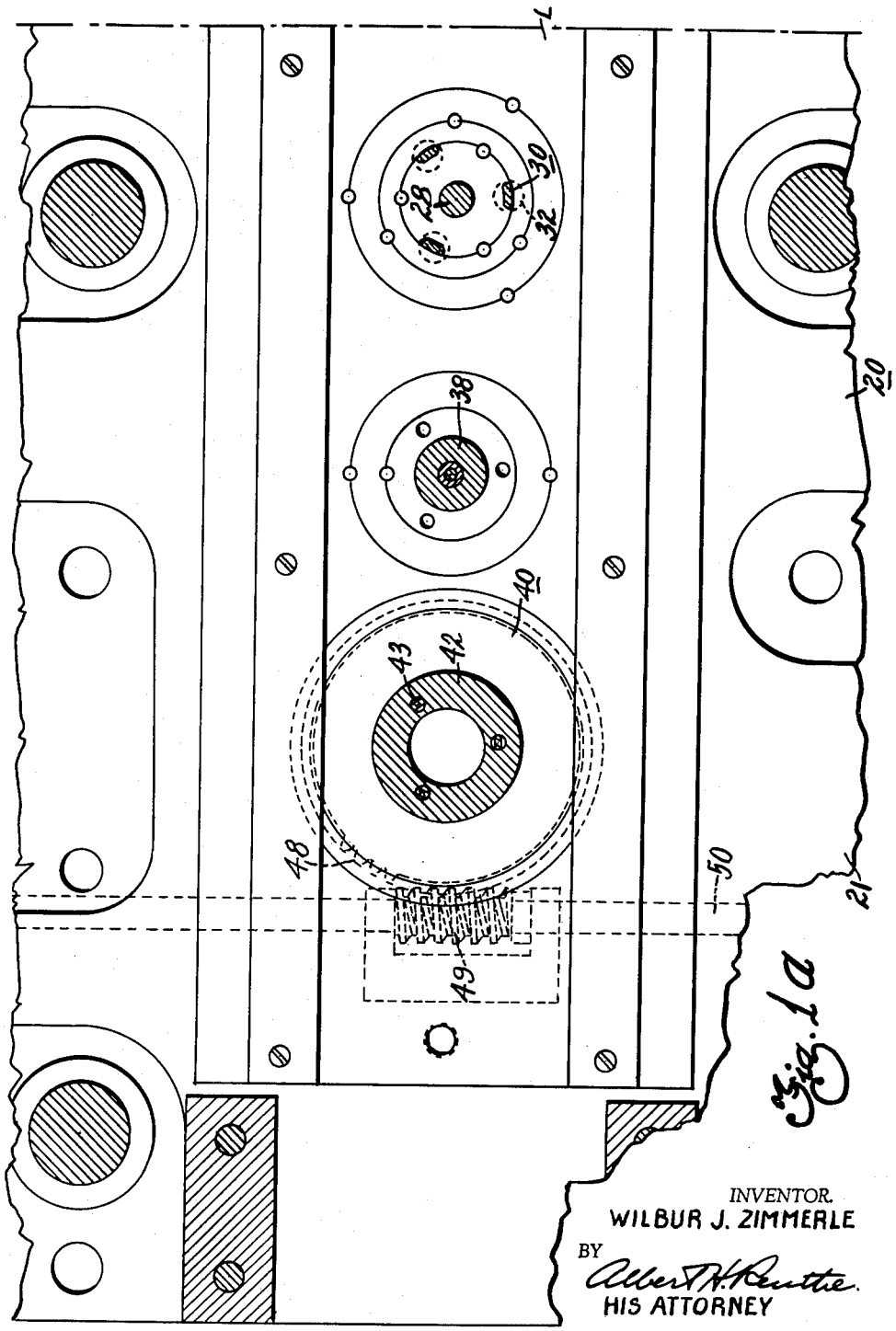
Figure 2B:
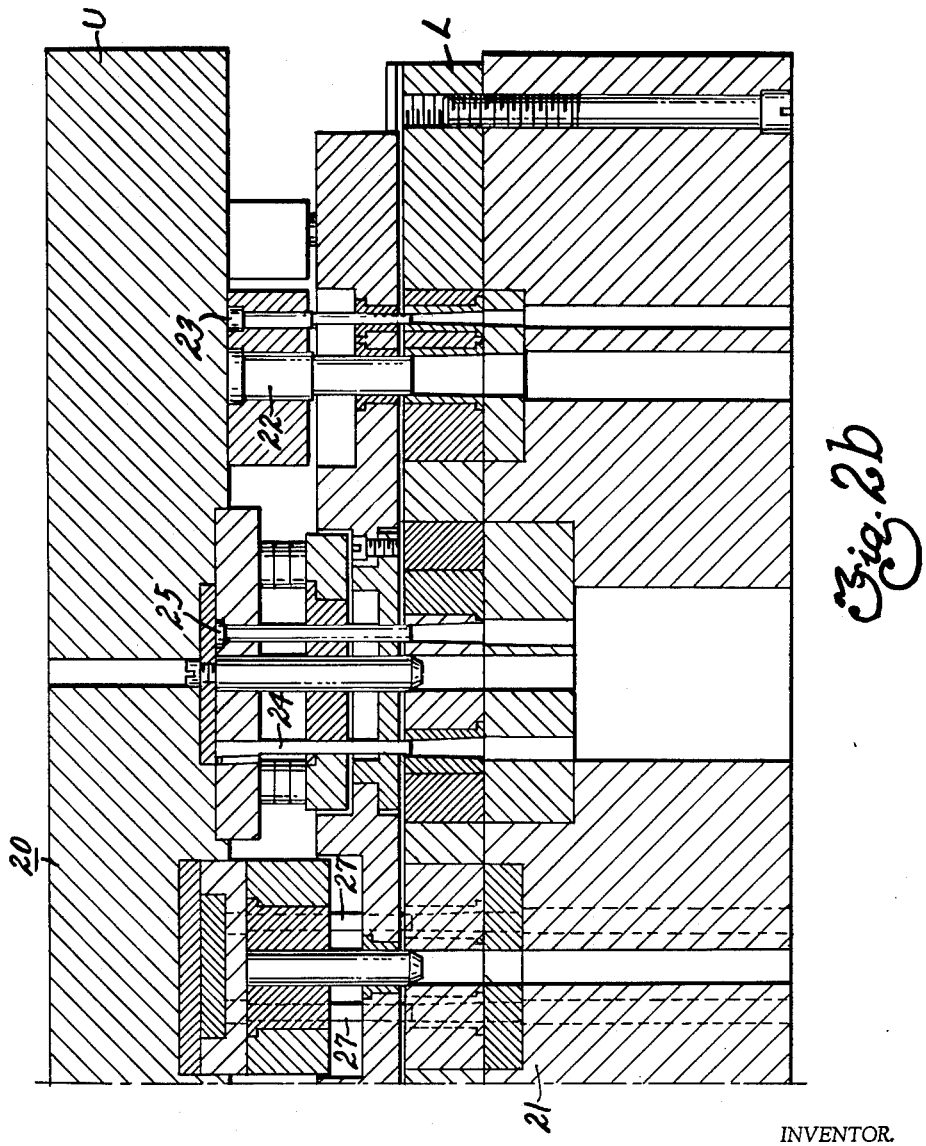

FIGURES 5 and 6 are side and end views, respectively, of die components for use in the die means and mechanism of FIGURES 1 and 2 subject to indexing control by means featured in FIGURES 3 and 4.

FIGURE 7 is a perspective illustration of a skewed rotor lamination assembly fastened together in accordance with the present invention.

FIGURE 8 is a perspective illustration of multi-spiral skewing of slotted rotor lamination means provided with interlock fastening in a procedure in accordance with the present invention.

FIGURE 9 is a partially sectioned side view of a dynamoelectric machine rotor means using laminated components such as shown by FIGURES 7 and 8 as well as winding means cast therewith into an assembly maintained in alignment and interlocked in accordance with the present invention.

FIGURE 10 represents an end view of the rotor means of FIGURE 9 with a wound stator core assembly of a dynamoelectric machine in accordance with the present invention.

FIGURES 11 and 12 are elevational views of further rotor laminations having interlock features in accordance with the present invention.

In FIGURE 1 there is shown a plan view of a multi-station progressive die means assembly mechanism generally indicated by numeral 20. Any number of stations or locating positions can be provided on such an assembly mechanism and these stations are to be spaced along a frame or body portion 21 in longitudinal alignment with each other to permit feeding of a continuous metal strip means of a type illustrated in a copending application S.N. 125,190 filed July 19, 1961 and belonging to the assignee of the present invention. In this copending application there is a showing of formation of rotor laminations from such a continuous metal strip that can be further utilized to form stator lamination assemblies in accordance with procedure set forth more specifically in that application. The present disclosure provides refinements for assembly and procedure of rotor lamination components of dynamoelectric machines, each of such components being adapted to have an interlock fastening means therewith adapted for skewed alignment of laminations relative to each other by machine operation in a manner which will facilitate and speed up rotor lamination assembly and which will improve alignment characteristics as well as stability of rotor components. The assembly mechanism disclosed therein provides die portions, one of which includes a ring member or die portion that can turn in predetermined increments to provide automatic skewing and complete assembly of laminated rotor components for a dynamoelectric machine by use of these die portions.

The assembly mechanism generally indicated by numeral 20 in FIGURES 1 and 2 includes a first position or station where a die means 22 carried by an upper portion U pierces a shaft hole and smaller die means 23 pierce pilot holes for the strip of metal in addition to three more special holes pierced for the express purpose of allowing room for interlock means to be turned radially after formation thereof in at least the fourth station.

In the second station illustrated in FIGURES 1 and 2, the assembly mechanism provides die parts to pierce all normal rotor lamination holes including die parts 24 carried by the upper portion U of the assembly mechanism 20 as well as an annular rod-like die part means 25 to form predetermined holes in cooperation with complementary passages in a lower portion L of the die means and assembly apparatus 20. The exact disposition of these die parts and holes depend upon a particular rotor lamination configuration and stamping of rotor laminations accordingly can be modified as necessary.

A third station or locating position of the assembly mechanism 20 provides die parts 27 adapted to cooperate with appropriate cutouts in the lower portion L and to form or pierce three oblong or kidney-shaped holes for only one lamination per rotor. These oblong or kidney-shaped holes in the rotor laminations have a location coinciding with that of interlocks or interlock fastening means formed in the fourth station and the purpose of the third station is to provide one lamination with such oblong openings pierced therethrough so as to avoid sticking or adherence of a completed rotor lamination assembly to other rotor lamination assemblies during stacking or storing thereof in a suitable location. The third station, in effect, forms an end lamination having only the oblong or kidney-shaped holes therein so as to permit press-fitting of one interlock means thereto as will be described in further detail. It is to be noted that central guide posts can be provided for the second and third stations as well as the fourth station and each having a tapered end so as to assure proper alignment from the metal strip means relative to the shaft hole previously punched by the die part 22 in the first station. Intermittent cutting in the third station where the oblong or kidney-shaped holes are formed for only predetermined rotor end laminations can be controlled by having a cam on one side of die portion heads or upper part U during piercing and then removing this cam control that is retractable so as to obviate possible cutting thereby for remaining majority of laminations where no oblong or kidney-shaped holes are to be cut.

Interlock means in accordance with the present invention are formed and pierced in the fourth station where there is a central guide 28 having a tapered end to assure proper alignment to the shaft opening previously pierced in the sheet metal and where a die means generally indicated by numeral 30 can be carried by the upper portion U to cooperate with a suitable passage in the lower portion L of the assembly mechanism 20. The die means 30 can be seen in further detail in FIGURES 5 and 6 and an ejector member 31 biased upwardly by spring 32 in alignment with the opening of the lower portion L can be used to aid in pushing the interlock means out of a die hole so that the stock strip can progress to the next station without interference. Depth of displacement of interlock is controlled by proper setting of complementary die parts. The end structure of the die means 30 can be best seen in FIGURES 5 and 6 and includes a flat end 33 along one edge thereof as well as a semi-annular recess portion 34 extending angularly therefrom to have a predetermined offset such as 22° from a horizontal with which the flat or blunt end 33 coincides. The die means can also include a flat side surface 35 against which a set screw can be pressed so as to hold the die means 30 in position. Further details as to the interlock means formed by these die means 30 will be provided subsequently herein.

An optional fifth station can be provided to pierce relatively larger holes centrally in predetermined rotor laminations by use of a die part 38 so as to produce a counter bore in a rotor assembly. This means that another intermittent cutting station with corresponding cam action is provided for the fifth station.

The final station or sixth in the sequential positions noted thus far is the blanking and stacking position generally indicated by numeral 40 wherein an important procedure in accordance with the present invention occurs. Since a laminated rotor assembly for use on a dynamoelectric machine generally is required to have a skewed or spiral alignment of individual rotor laminations relative to each other there is provided a rotatable angular die portion or insert 41 that turns in small radial increments each time a new lamination is blanked. A blanking die 42 serves to cut an angular rotor lamination from the continuous strip of sheet metal fed through the successive stations and a fixture punch die means 43 having a blunt end or edge portion 44 with an incline on one side thereof free of any recesses serves to effect simultaneous interlock of one lamination to another subject to small radial displacement of a previous rotor lamination each time a new lamination is blanked. Thus, it is in the final or sixth station where the rotor assembling operations occur directly in the die means so as to produce a completed rotor which can have an accurate outer diameter as formed by the rotor blanking die 42 such that all burrs extend in the same direction so that generally no extra external cutting or machine turning of lamination metal is needed though at most scratch brush cleaning and finish grind operations can be provided to remove die cast metal flash. Station five can be eliminated where the rotor assembly is to have no counterbore therein and the metal strip means after completion of the rotor assemblies in the die can continue as stock material having a bore or opening centrally therein subjected to further die operations in further press means of a tandem machine set up in which stator lamination assemblies can be made by progressive dies in accordance with the disclosure of the copending application S.N. 125,190. The procedure for stator processing is similar to that for rotor assembly except that no skew is involved and the turning die ring means or insert 41 in the last position is not provided for the stator assembly. Also, in view of the fact that the stator lamination assembly requires no skewing, there is no limitation that the interlock means has to include radially separated and aligned slits as will become more apparent from the following description. Since no counterbore is involved on a stator lamination assembly mechanism that station can also be eliminated. A retractable pressure pad or lower portion can be incorporated with the final assembly station such that a predetermined stack-up of rotor laminations can be formed prior to ejection from that particular station of rotor assemblies ready for die casting of suitable winding means therewith. It is to be noted that slanting side surfaces are required on die means such as 30 on only one side whereas on a stator lamination assembly there can be such slanting surfaces on two sides joined by a central flattened portion which is in effect extruded from the lamination metal to be displaced laterally therefrom into a location substantially parallel thereto though coplanar with an adjoining lamination subject to predetermined incremental angular displacement between adjoining rotor laminations as accomplished by rotation of the die portion or insert means 41.

The die portion or insert means 41 can be suitably journalled relative to the lower portion L of the assembly mechanism and a gear means 46 can be attached to a lower end of the rotatable die portion or insert means 41 by suitable fastening bolts 47 as visible in FIGURE 2. The gear means 46 can have external miter teeth 48, adapted to mesh with a worm gear 49 suitably keyed to be mounted on a transverse shaft 50. This shaft together with the worm gear can be suitably journalled on the assembly mechanism 20 as indicated in views of FIGURES 1 and 2 and the shaft 50 extends laterally to one side thereof where an indexing control means generally indicated by numeral 52 in FIGURES 3 and 4 can be attached to a free end of the shaft 50 suitably journalled to a body portion 53 of the indexing control means 52. Actually, the indexing control means 52 is a component mounted on one side of the lower portion L of the assembly mechanism generally indicated by numeral 20 and the indexing control mechanism can govern operation of the piercing strokes as well as of the incremental radial shifting of the rotor lamination parts in the final assembly station. A suitable fluid actuator 54 can have a piston 55 reciprocable therein to have a rod 56 carried by the piston journalled by a bell crank member 57 carried on the end of the shaft 50. A suitable pivotal connection 58 can be provided between the bell crank member 57 and a fitting 59 on one end of the rod 56. A suitable one-way clutch means or Sprague clutch indicated by numeral 60 can be carried by the free end of the shaft 50 and the bell crank 57 can be provided on the outer or housing portion of this commercially available clutch adapted to engage the shaft in only one way so as to impart rotation to the shaft 50 in only one direction whenever a spiral or skewing of rotor laminations in one direction is to be accomplished. It is to be noted that this clutch arrangement can be modified to permit formation of a multi-spiral or herringbone-like skewing of rotor laminations. A roller means 62 can be carried on a lateral projection or extension 64 of the Sprague clutch housing 60 and this roller 62 follows a peripheral path of a cam means 66 which can be adjustably mounted in predetermined positions on a projecting shaft end 67 suitably mounted on one side of the lower portion L of the assembly mechanism generally indicated by numeral 20. The shaft-like end 67 forms part of a sleeve-like member 68 having a bifurcated extension 69 to which an adjustable rod means 70 can be pivotally attached. The rod means 70 is centrally adjustable to govern extent of stroke for opening of die portions of the press assembly mechanism which operates in a conventional manner forming no part of the present invention. It is to be understood that in place of the clutch and worm-miter gearing it would be possible to have the indexing of the insert means or rotatable die portion 41 accomplished by a rack and pinion wherein the rack can be part of a rod carried by a piston reciprocable in a pneumatic or hydraulic actuator cylinder.

In FIGURE 7 there is an illustration of a rotor lamination assembly generally indicated by numeral 72 having features in accordance with the present invention. The rotor assembly 72 includes individual laminations 73 having an outer diameter or periphery requiring no further machining and finishing as blanked from a strip of sheet metal by use of the blanking die 42 noted earlier. The rotor lamination 73 is provided with a central shaft aperture or hole 74 formed by the die part 22 mentioned with reference to FIGURES 1 and 2. The rotor lamination 73 further includes the three special holes identified by a reference numeral 75 in FIGURE 7 and pierced or punched in the first station by the die parts or portions 23. The purpose of these special holes or of the aperturing represented by reference numeral 75 for each lamination 73 is to allow room for radial displacement of laminations adjacent to each other to accommodate the skew or spiral interlock of laminations to each other as accomplished by interlock means generally identified by reference numeral 76. Each interlock means 76 includes a flattened end, plateau or platform segment 77 integral with an annular stretching segment 78. One end of the stretching segment 78 is integral with the metal of the lamination 73 but the cross-section of the stretching segment is reduced whereas the flattened end 77 can be press-fitted into locking or wedging engagement with an adjacent lamination between edges of a pair of radially separated though arcuate slits 79 that define the segments of the interlock means 76. Uniform skewing or spiral-like alignment of slots 80 of the lamination 73 can be seen in FIGURE 7 and this spiralling is represented by lines 81 in that view.

In FIGURE 8 there is a showing of a further rotor lamination assembly generally indicated by numeral 82 formed by a stacking of individual laminations 83 each having a shaft hole 84 as well as cooling passages C and four special holes or aperturing 85 similar to the holes or aperturing 75 noted in the view of FIGURE 7. Interlock means generally indicated by numeral 76 can be provided adjacent to each of these special holes 85 and the structure of this interlock means is substantially identical to that shown in FIGURE 7. Each of the laminations 83 includes a plurality of radially outwardly located slots 86 into which rotor winding means can be cast and it is to be noted that a herringbone-like opposite skewing represented by reference numerals 87 and 88 is indicated in this view. The die portions can be adapted to provide two sets of interlock means on opposite sides of the special holes 85 such that the die parts and the assembly mechanism in accordance with the present invention can be used directly first, to assemble laminations with a skew in one direction and then bringing into use a second set of locks or fastening means such as 76 in an opposite direction. The interlock means 76 regardless of direction of use will involve a flat platform end segment as well as a stretching segment as indicated earlier, and the partially sectioned view of FIGURE 9 shows adjoining laminations secured to each other such that the flattened end portion is wedged and press-fitted against peripheral edges provided by slits 79. Also, in FIGURE 9 there is a showing of a cast metal squirrel-cage winding means generally indicated by numeral 90 on a rotor lamination assembly formed by use of laminations 73 or 83 depending upon whether three or four interlock means 76 are to be provided for each rotor lamination stackup. The cast metal of the winding means 90 is carried in the slots 80 or 86 of these laminations 73 or 83 which are skewed as indicated. The cast metal winding means 90 includes conductor bar portions filling these slots 80 or 86 as well as end rings 92 joining opposite ends of the conductor bars in a usual manner together with axially and laterally projecting cooling fins 94 that can be seen in FIGURES 9 and 10. In FIGURE 10 there is an outline of a stator lamination assembly generally indicated by numeral 96 having windings 97 in slots thereof. The stator assembly 96 is formed of a plurality of laminations fastened as disclosed in copending application S.N. 125,190 also having interlock means requiring use of no rivets.

It is to be noted further that the rotor means illustrated in FIGURES 9 and 10 can be provided with a counterbore aperturing indicated by reference numeral 98 and formed by die part 38 in the fifth station of the assembly mechanism 20 of FIGURES 1 and 2. Interlock fastening means generally indicated by numeral 76 can be provided adjacent to special aperturing or holes 75 in a manner similar to that disclosed by the illustration of FIGURE 7 and slots 80 can also be provided adjacent to a radially outer periphery of such rotor laminations. In FIGURE 12 there is an illustration of a lamination 99 for use in the rotor also having free interlock means 76 adjacent to special holes or aperturing 75 and provided with oblong cutouts or cooling passages C totalling three in number rather than four as provided for the lamination 83 of FIGURE 8. In between these three cooling passages C there can be additional holes formed by die parts 25 in station two as noted earlier. These holes are identified by a reference H in the view of FIGURE 12. A suitable central shaft aperture formed by die part 22 can also be provided for each lamination 99 having the interlock fastening means 76 in accordance with the present invention. The rotor laminations are progressively built up by wedging and hooking one lamination to another. In addition to interference binding by press fit of mating adjacent edges there can be a spreading of the flattened end to enhance interlock. It is to be noted that the interlock fastening means 76 can be used to align and hold together laminations for rotor means, stator means as well as transformer cores and the like wherein laminations are to have juxtaposed relation throughout the thickness of a lamination assembly. The same dies can be used for stamping rotor laminations from a strip of metal and for actually assembling such rotor laminations progressively while providing a predetermined arcuate indexing by the insert or die portion 41 rotatable as described earlier. One of the advantages of blanking a rotor die and assembling directly with all burrs along edges thereof extending in one direction can be found in the fact that further machine turning and cutting of the outer diameter of the rotor can be avoided except for boring of a rotor hole in a rotor lamination assembly. The stretched segment and flattened end portion or segment of each interlock fastening means 76 has a generally elbow-shaped configuration and the die means can stretch the angular segment between the parallel platform end portion and lamination from which the metal is struck and extruded. Provision of the special holes indicated by reference numerals 75 and 85 permit angular displacement between adjacent laminations so as to allow sufficient space for interlock means 76 to be skewed simultaneously with skewing of the winding slots along an outer peripheral edge of each of the rotor laminations. In effect, there is a crosskeying of at least three interlock means in accordance with the present invention so as to provide a stable and predetermined alignment of rotor laminations step by step during assembly thereof in the die means as set forth earlier. The flattened end portion of each of the interlock means serves to establish a winding wedge fit to edges of slits of an adjacent lamination and the remainder of the metal of the interlock means is stretched. The stretching occurs as the die punch means cuts the slits substantially concentrically relative to each other and the flattened end portion is forced to move directly laterally in one direction away from the plane of a stator lamination. The stretching occurs chiefly as to thickness and longitudinally rather than in width since the slits are cut by opposite edges of the die punch means. Actually the sides of the stretched segment are only displaced rather than definitely cut and the free flattened end is the portion that is cut by the die means in particular. The elbow-shaped metal of the interlock means 76 can be substantially axially and spirally aligned in accordance with the degree of skewing desired. The angle of skew can be positively controlled during die assembly procedure in accordance with the present invention and skew can occur in a range between a fraction of a degree to any multiple of full arcuate degrees depending upon electrical performance requirements of a particular rotor lamination assembly as a magnetic core in a dynamoelectric machine. The flattened end portion permits drawing of the metal of each interlock means to one side of metal remaining in a lamination and the special holes identified by reference numerals 75 and 85 provide clearance to avoid improper assembly during progressive die assembly of rotor laminations into a skewed or multi-spiralled relationship. It is to be noted that as mentioned earlier, one lamination per rotor can be provided with oblong aperturing or holes to assure interference fit of an adjacent interlock means though having no further interlock to bind relative to an adjacent lamination. This assures that the rotor lamination assemblies can be handled and stacked free of any danger of unwanted binding between finished rotor assemblies. Generally a skew between adjacent rotor laminations can involve an arcuate angular distance up to between 5° and 30° for practical purposes with degree of skew varying inversely as to depth of lamination stack up. Use of skew pins and the like to provide accurate skew for such an angular relationship would prove to be quite difficult whereas the interlock means in accordance with the present invention is particularly adapted for skewing of rotor laminations using the die parts directly for assembling purposes as noted earlier. The fixture die parts can have a slightly smaller size than the die punching parts and interference sticking or binding occurs principally along sharply barbed opposite lateral edges of the flattened end portion of each of the interlock means 76. The die parts operate alternately to stamp the necessary holes, apertures and interlock means relative to the rotor laminations and also serve to rotate positioning of one lamination relative to another to achieve skewing with a minimum of handling of laminations once they are stamped progressively from a continuous metal strip means. Rotor and stator lamination parts can be formed from a continuous metal strip means subjected to sequential punch press operations and the outer diameter of the rotor means can be held accurately to blanking size with all burrs in the same direction. Possibility of distortion of laminations relative to each other is minimized and no skew pin and the like is required to cast a metal winding relative to a simplified assembly setup wherein a line-up machine can be eliminated. A skew of substantially upwards of 30° is not a limit resulting from the interlock means which do not limit the physical skewed alignment of laminations even when dualed for a herringbone slot rotor means. For practical purposes limitation physically on the amount of skew is on the lower value of the range since below 5° skew difficulty can result from outer diameter of rotor laminations. Depending upon how close the interlock means are to the center of the rotor, there can be increase in difficulty in attaining a small skew. Generally it is noted that skew decreases for stack up of greater depth or width of metal laminations whereas the smaller the stack the greater the skew which is doubled for herringbone slot configurations.

While the embodiments of the present invention herein disclosed constitute preferred forms, it is to be understood that other forms might be adopted.

What is claimed is as follows:

1. In a procedure of manufacture of a metal lamination assembly for rotors and the like by use of progressive die operation on a strip of material to have conductor-receiving slots therein, the steps comprising, aperturing the strip of material in predetermined locations, punching the strip of material to provide one pair of cuts extending into the strip material from where subjected to said aperturing, bending strip material between the cuts due to punching into substantially elbow-shaped fastening portions, and joining laminations of strip material in sequence individually to each other completely in die means progressively operable to form and join metal laminations.

2. The procedure of claim 1 wherein during said joining there is incremental angular shifting and displacement of one portion of the die means between said joining of immediately adjacent laminations for skewing slot positioning of a rotor stack-up progressively formed thereby.

3. The procedure of claim 1 wherein simultaneously with said joining there is a predetermined aligning of immediately adjacent laminations to each other accomplished directly in the die means.

4. The procedure of claim 1 wherein simultaneously with said joining there is a skewing of positioning of adjacent laminations into multiple herringbone-like spiral interlock as accomplished directly during die assembly thereof.

(References on following page)

References Cited by the Examiner

UNITED STATES PATENTS

| | | | |
|---|---|---|---|
| 2,283,629 | 5/42 | Heftler | 29—433 |
| 2,368,295 | 1/45 | Goran | 22—203 |
| 2,933,204 | 4/60 | Ebbert | 29—433 X |
| 2,996,791 | 8/61 | Hicks | 29—155.53 |
| 2,998,638 | 9/61 | MacLaren | 29—155.53 |
| 3,060,992 | 10/62 | Hopp et al. | 153—2 |
| 3,062,262 | 11/62 | Post | 153—2 |
| 3,070,058 | 12/62 | Boyer | 29—429 X |

JOHN F. CAMPBELL, *Primary Examiner.*

ARTHUR M. HORTON, *Examiner.*